United States Patent
Gundlach

[19]

[11] Patent Number: 5,966,105
[45] Date of Patent: Oct. 12, 1999

[54] FREE-VISION THREE DIMENSIONAL IMAGE WITH ENHANCED VIEWING

[75] Inventor: Gregory E. Gundlach, Chicago, Ill.

[73] Assignee: Gregory Barrington, Ltd., New Canaan, Conn.

[21] Appl. No.: 08/760,191

[22] Filed: Dec. 4, 1996

Related U.S. Application Data

[63] Continuation of application No. 08/484,641, Jun. 7, 1995, abandoned.

[51] Int. Cl.[6] .............................. G09G 5/00; H04N 13/04
[52] U.S. Cl. .............................. 345/32; 40/454; 359/628; 348/59
[58] Field of Search .............................. 345/6, 4, 32, 47; 40/454, 541, 564, 706, 534, 446, 451, 624, 559; 359/1, 15, 288, 485, 628, 19, 33, 478; 355/22; 385/120; 348/40, 41, 59; H04N 13/04

[56] References Cited

U.S. PATENT DOCUMENTS

| | | | |
|---|---|---|---|
| 3,686,781 | 8/1972 | Calhoun, Jr. .............................. | 40/454 |
| 3,702,033 | 11/1972 | Coleman .............................. | 40/541 |
| 3,891,305 | 6/1975 | Fader .............................. | 359/478 |
| 3,957,351 | 5/1976 | Stockwell .............................. | 40/541 |
| 4,130,337 | 12/1978 | Okoshi .............................. | 359/33 |
| 4,158,481 | 6/1979 | Hoyer .............................. | 359/478 |
| 4,481,050 | 11/1984 | Gundlach et al. .............................. | 359/628 |
| 4,535,396 | 8/1985 | Guthrie .............................. | 40/541 |
| 4,596,458 | 6/1986 | Gundlach .............................. | 355/22 |
| 4,695,130 | 9/1987 | Medina et al. .............................. | 359/478 |
| 4,701,772 | 10/1987 | Anderson et al. .............................. | 359/288 |
| 4,989,956 | 2/1991 | Wu et al. .............................. | 40/546 |
| 5,052,776 | 10/1991 | Fukushima et al. .............................. | 385/120 |
| 5,130,825 | 7/1992 | Kok-Schram de Jong .............................. | 40/706 |
| 5,146,703 | 9/1992 | Boden .............................. | 40/454 |
| 5,237,766 | 8/1993 | Mikolay .............................. | 40/564 |
| 5,291,317 | 3/1994 | Newswanger .............................. | 359/15 |
| 5,485,309 | 1/1996 | Baranetz et al. .............................. | 359/486 |
| 5,493,427 | 2/1996 | Nomura et al. .............................. | 348/59 |
| 5,497,189 | 3/1996 | Aritake et al. .............................. | 348/41 |

*Primary Examiner*—Jeffery Brier

[57] ABSTRACT

A structure for creating brighter viewing three dimensional images which have a spacer with a rastor pattern having parallel lineations of alternately opaque and optically clear portions on one side of the spacer; an image on the opposite side of the spacer parallel to and spaced apart from the rastor pattern such that when viewed from said rastor side of the spacer, a three dimensional image is seen; and, the rastor pattern, spacer and or the image form a light enhancing structure to increase light impingement through the structure by various means and combinations of structure of the rastor, spacer and/or the image.

40 Claims, 17 Drawing Sheets

FREE-VISION THREE DIMENSIONAL IMAGE WITH ENHANCED VIEWING

This application is a continuation of Ser. No. 08/484,641 filed Jun. 7, 1995 now abandoned.

RELATED APPLICATIONS

Reference is made to U.S. Pat No. 4,596,458 issued Jun. 24, 1986 to Gregory E. Gundlach, entitled: METHOD AND APPARATUS FOR MAKING A FREE VISION THREE-DIMENSIONAL IMAGE EMPLOYING PORTABLE EQUIPMENT AND PROVIDING INCREASED SPEED AND WITH ENHANCED VERSATILITY, and assigned to the present assignee, the disclosure of which is hereby incorporated by reference.

FIELD OF THE INVENTION

The present invention relates to methods and apparatus for making a three dimensional appearing image. More specifically, the present invention relates to methods, apparatus, and arrangements which enhance the illumination and expand the applications of free vision three dimensional displays.

BACKGROUND OF THE INVENTION

Many methods have been developed to generate 3-D images. These methods differ from two dimensional display technologies such as photography and television in that they deliver laterally displaced images of a subject to a viewer's eyes. The viewer synthesizes three-dimensional experience of objects and space from these slightly displaced views. Many methods deliver a specific pair of images, one to each eye. With these methods the viewer is confined to looking at the subject from a predetermined position for a particular stereo effect. In contrast, holography, lenticular screen, and rastor display methods enable many viewing angles of a subject.

Holography is significantly different from other methods of three-dimensional imaging. Because holography requires the use of coherent light sources such as lasers to store interference patterns of light, it is color and scale limited, and complex to practice relative to lenticular and rastor methods.

Lenticular screen methods utilize ordinary light sources to record and display a 3-D image. Different views of a subject are interlaced and laminated behind an array of semi-cylindrical lenticular lenses. Interlacing is the process of placing together images that have been recorded from different viewing positions in thin parallel linear strips (or lineations), usually through the use of a black line rastor or lenticular screen. The resultant interlaced pattern of images is then placed behind the lenticular lenses at their focal distance so that only one lineation is visible through each lens from any particular viewing angle. Each eye sees different lineations (which represent corresponding distinct views of the original subject) and consequently people looking at the display can construct three dimensional images in their minds.

Lenticular screen images are limited in terms of clarity and resolution, but more importantly, because of the geometric properties of their optics, many viewing zones result. A slight shift in viewing position will often present the viewer with lineations from the adjacent grouping. The result is a pseudoscopic or compromised effect.

Rastor methods of three dimensional display are capable of higher quality results. As with lenticular screens, different views are interlaced in parallel lineations but, rather than displaying this interlaced pattern behind a lenticular screen, it is presented behind a black line rastor. The rastor is formed of parallel lineations which are alternately clear and dark. The widths of these clear and dark lineations can be adjusted to reduce the viewing zone "jump" that is intrinsic to lenticular optics. However, the use of opaque lineations reduces the amount of light that illuminates the interlaced pattern behind it, so back-lighting is employed. This enables the interlaced pattern to be viewed through the slits in the rastor so that individual images are visible from different viewing angles. This produces the three dimensional effect.

Prior art rastor displays have produced satisfactory images for viewing. However, they have not solved problems of viewing in bright ambient lighting conditions or extreme image dislocation at the viewing transition point between groupings of lineations. In addition, they usually required means to illuminate the structure from behind the image.

SUMMARY OF THE INVENTION

It is therefore an object of the present invention to increase the brightness of rastor displays.

It is a further object of the present invention to enable rastor displays to be employed in brighter ambient lighting situations.

Still another object of the present invention is to produce three dimensional appearing large image displays such as, for example, outdoor displays like billboards.

Yet another object of the present invention is to enable increased front lighting of the interlaced pattern of images in the display.

Yet another object of the present invention is to provide for a front projection of moving three dimensional images for various applications such as movie theaters.

There are other objects and advantages of the present invention. These will become apparent from the description of the presentation of the invention along with drawings and claims.

The invention may include a transparent spacer with a rastor pattern on one side and an image on the other so that a person looking at the structure from the rastor side sees a three dimensional appearing image, or an image that changes as the person moves relative to it. The structure is light enhanced by providing internal or external structure portions that enable more light to enter or internally reflect within the structure without impairing the view.

The light enhancing structure may include a rastor pattern with parallel lineations of alternately opaque and optically clear portions enhanced by louvers, blinds, lenticulars, gradient lenses and the like. It may also or alternatively have internal reflective structures between the rastor and the image. In large structures like billboards the lighting may be internal and have reflective structures to enhance light. Other structures may include highly diverse projection and viewing angles so light enters from areas not blocking a person's viewing angle.

The above discussed free vision three-dimensional images are greatly enhanced by the present invention. It enables the production of images with improved brightness, value contrast, and viewing zones with reduced image dislocation. It makes large scale outdoor displays feasible. Front lit embodiments enable printing the image on opaque materials such as paper and mounting them in conventional display locations. Freevision film projection is made possible in a unique and novel way. The present invention's objects and advantages are accomplished by a variety of new means and structures that can be selected with consideration of different viewing conditions and contexts.

In one structure, a rastor is used in a novel combination with lenticular elements. By alternating opaque lines with lenticular optics, the resulting display has a much broader continuous viewing range. Brightness can be enhanced through the addition of a light enhancing structure reflective layer behind the black lines. In another structure, rastor lines are alternated with index gradient lens elements and, again, a light enhancing reflective structure may also be employed. In yet another structure, when display is on a sufficiently large scale, fluorescent tubes or other light emitting structures may be used for internal illumination of the image. Other large scale applications employ louvers or wedges to allow light into the display.

By using a repeating pattern in the background or foreground, dislocation of these features can be eliminated when viewing the display. This is especially important when the display has a wide angle of continuous view, because image dislocation tends to be stronger in these cases. Structures such as those referenced by way of examples above may be combined with each other to achieve the results of brighter, larger, more spectacular, moving or otherwise enhanced images.

Procedurally, all of these variations are based on a method which comprises:

a) Recording images of a subject through the use of a multiple lens camera or a single camera moved to different angles of view relative to the subject as described in U.S. Pat. No. 4,596,458 incorporated herein by reference; or recording images of a subject generated by computer graphics. In one version of the method the subject is chosen and arranged so that the background contains a repeating pattern that is precisely positioned relative to the recording angles of view.

b) A printing or projection means such as, for example, a film projector, CRT, active or passive matrix, or their equivalents, by which the series of recorded images are interlaced in a pattern on a sheet of film, paper, or electronic display surface; this may include such procedures as contact printing to duplicate a previously interlaced pattern of images.

c) Assembling and displaying the interlaced pattern behind a rastor or optical element and rastor combination in such a manner that the lineations in the interlaced pattern are parallel to and separated by a specific distance from the line rastor and/or optical elements.

d) Viewing the resultant three-dimensional image from the side of the rastor and/or optical elements furthest from the interlaced image on film stock, paper or electronic display surface or equivalent viewing structures.

e) Providing light enhancers so that a backlit image may have more light captured and reflected within it and front-lit images are enhanced by elements that may bring in ambient or specifically provided light without disrupting viewing.

BRIEF DESCRIPTION OF THE DRAWING

Reference is now made to the drawings wherein like reference numerals designate similar elements in the various views and in which.

DETAILED DESCRIPTION OF THE PREFERRED EMBODIMENT

Figure 1:
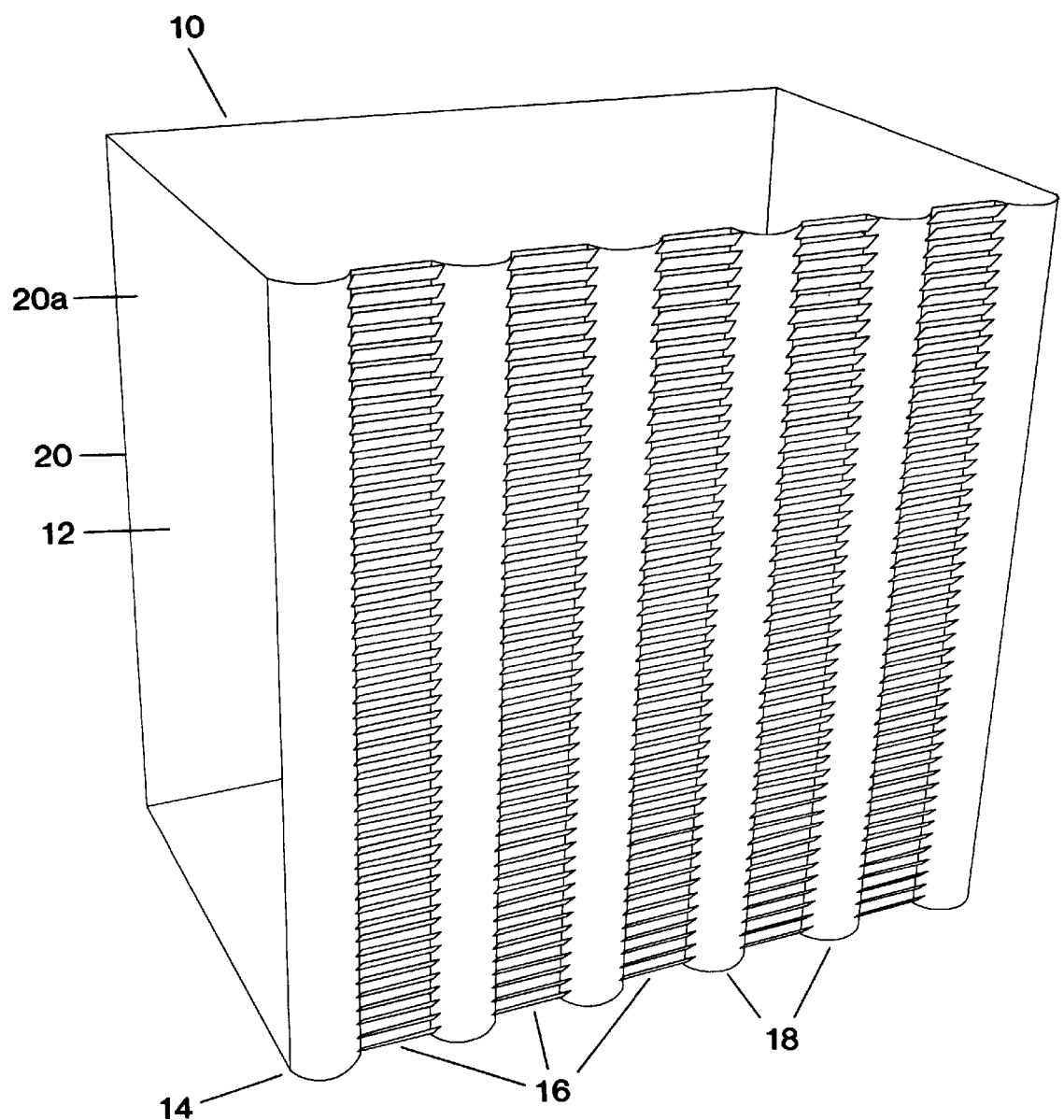
FIG. 1 is a perspective view of a free-vision three dimensional image display having a rastor formed of semi-opaque strips of horizontal wedges alternated with clear strips of lenticules.

Reference is now made to FIG. 1. A free-vision three-dimensional photograph 10 includes a transparent spacer 12 having a first side and second side. The transparent spacer 12 can be an optically clear plastic as, for example, polycarbonate or acrylic or another optically clear material such as glass, or an air gap between two parallel surfaces which will be more fully described hereinafter. A rastor pattern (referred to generally as 14) is on the first spacer side. The rastor has parallel lineations of alternately opaque portions 16 and optically clear portions 18. An interlaced image 20 is on the second spacer side 20a. The image is such that when viewed from the rastor's side of the structure, the viewer perceives that the freevision image structure enables viewing of a three-dimensional image—or alternatively or in conjunction with the three dimensional image—an image which appears to move as the viewer changes position with respect to the structure. The image, more fully described in U.S. Pat. No. 4,596,458 herein-above referenced is formed of parallel lineations of different views of a subject or different subjects. Such an image in conjunction with the spacer and rastor is perceived as a three-dimensional image and/or changing images as the viewer moves.

The clear portions 18 of the rastor 14 are lenticular lens structures. One suitable lenticular lens is extruded, cast, or pressed acrylic. Other suitable materials include glass, clear plastics and the like which may be made as an integral part of—or attachment to—the spacer structure. The lenticular lens 18 passes light through the rastor and the spacer to impinge on the image. The focal length of the lenticular lens may be selected to be equal to that of the thickness of the spacer 12 such that the illuminated image lineations are focused back to the eye of the viewer. Although this is not essential it will enable better viewing. Because the lenticules 18 focus the image lineations to the eye, distinct lineations can be seen without the need for a narrow slit. This use of lenticular elements in place of the narrower, clear slit portions of the rastor allows a large proportion of the rastor to be devoted to light transmission capabilities.

Figure 1A:
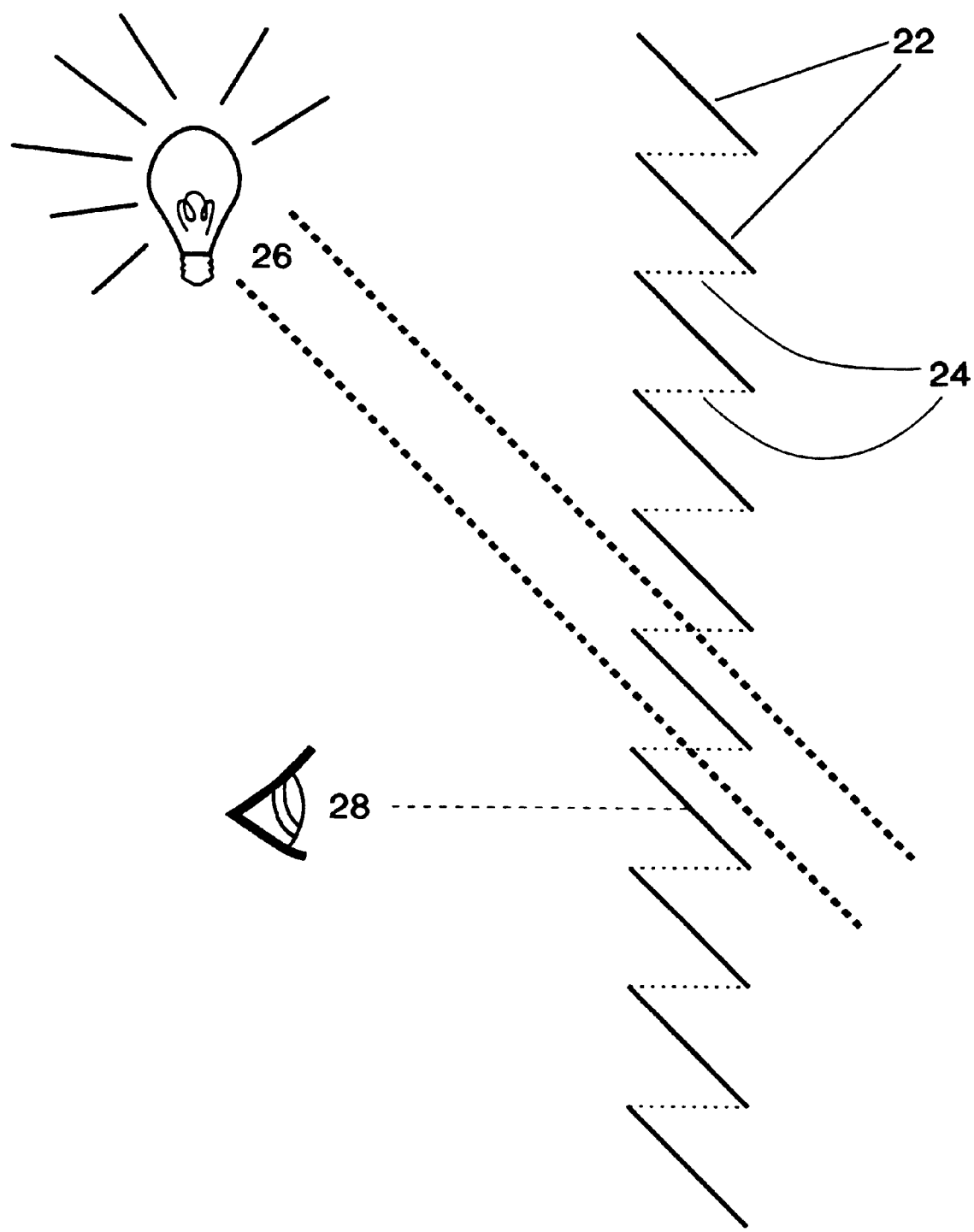
FIG. 1a is an enlarged side view of the wedge structure shown in FIG. 1.

A further enhancement to the light entering the structure is in the optically opaque portions 16 of the rastor. As is more clearly shown in FIG. 1a, this rastor portion is formed of wedge-like structures, although other light blocking and directing structures such as louvers are interchangeable. The structures include an opaque portion 22 and an optically clear portion 24. The optically clear portion 24 transmits light 26 into the structure but at an angle which does not interfere with the line-of-sight occluding properties of the opaque rastor pattern. This structure enables the front illumination of the image to increase significantly with brighter ambient lighting conditions, unlike the situation with the prior art slit rastors. It should also be recognized that the optically clear portions 24 of the rastor 16 can be lens type structures designed to achieve the objectives of bringing in additional light and/or focusing it on various portions within the free-vision image structure. This greatly increases the amount of light that can illuminate the image from the front.

The dimensions of the rastor pattern components (optically clear portions and optically opaque portions) are a matter of design choice. The dimensions may be chosen so that the individual elements, whether rastor, wedge, lenticule, and/or the like, are less than the optical resolution limits of the eye for the anticipated distance between the viewer and the free-vision structure. For lines, this may be as fine as 1/30 minute of arc.

Figure 2:
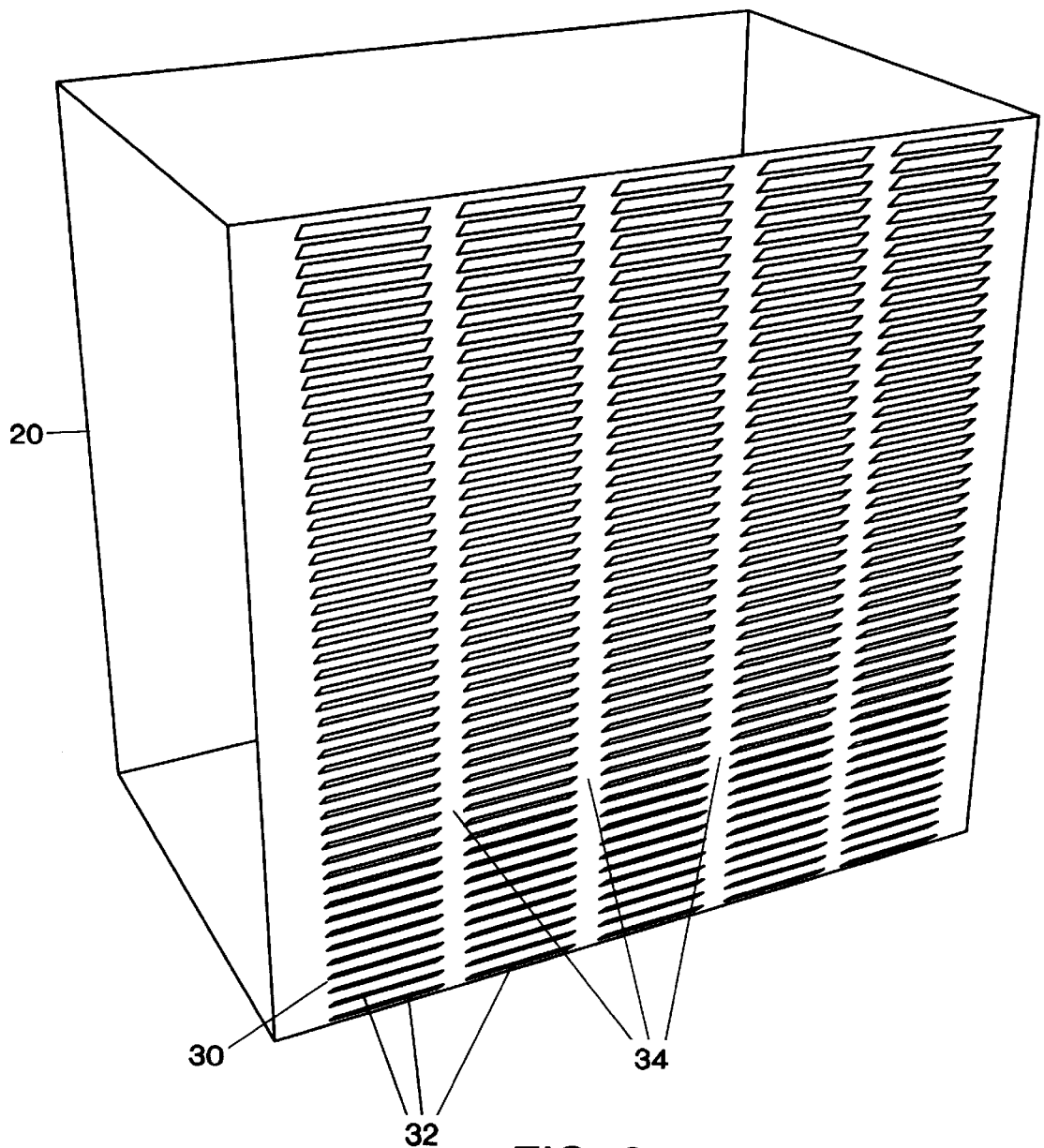
FIG. 2 is a perspective view of a free vision three dimensional image display having a rastor formed of vertical strips of horizontal louvers alternated with clear vertical spaces.
Figure 2A:
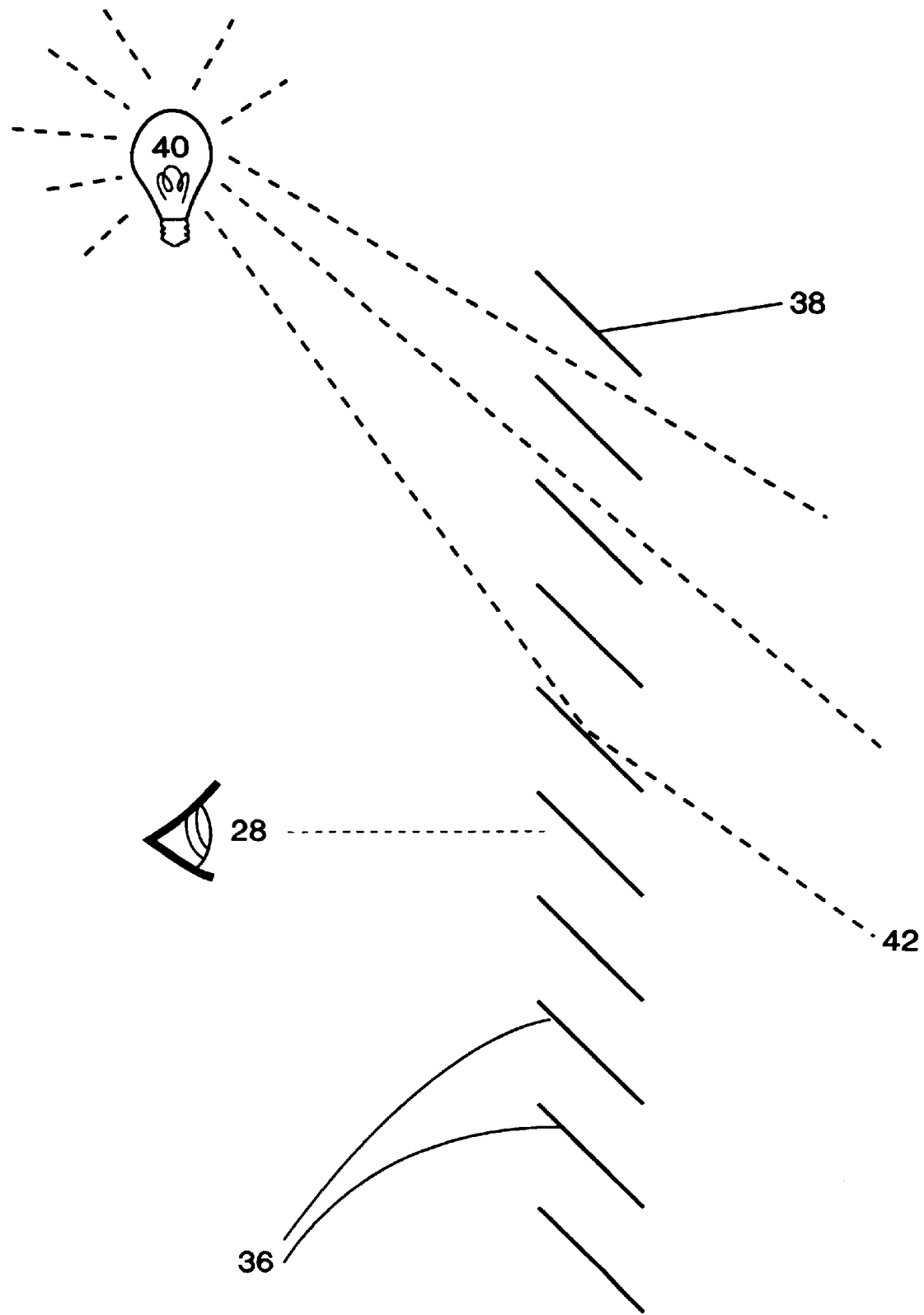
FIG. 2a is an enlarged diagrammatic side view of the louver structure shown in FIG. 2.
Figure 2B:
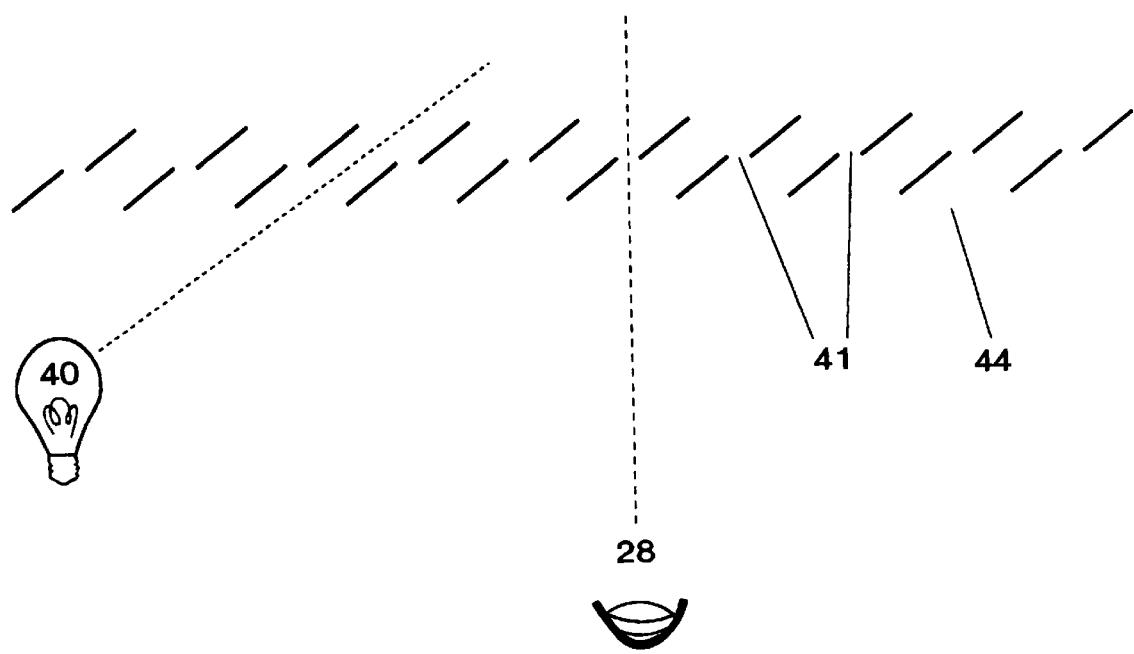
FIG. 2b is an enlarged diagrammatic top view of a vertical louver structure with slits up the middle of each louver.

Reference is now made to FIG. 2 which shows a free-vision image display similar to FIG. 1 but with a different rastor type. The rastor referred to generally by reference numeral 30 consists of parallel lineations of alternately opaque portions 32 and optically clear portions 34. The optically opaque portions are louver shaped structures. A side view diagram of this structure is shown in FIG. 2-A. The louvers have opaque portions 36 that are angled with respect to the line of sight 28 of a person viewing so that one sees opaque lineations where light can still enter the structure. The louvers may be adjustably angled to optimize viewing. If, for example, the free-vision image display is part of the billboard viewed from the roadside, the angles would have to be adjusted differently than if the display were a small picture mounted on the wall. Likewise, if viewers look at the image from the top, rather than from the bottom or straight ahead, the louvers may be (fixed or adjustably) angled downward rather than upwardly as shown. This would allow light from below the structure to travel through the louvers into the spacer and impinge on the image 20. In addition, the louvers can be made adjustable to optimize the gathering of light and they may also have a reflective surface 38 on the side of the louver that is hidden from the viewer. In FIG. 2-A the louvers 36 are angled upward toward a light source 40 above. This is indicated by the path of light ray 42. Illumination from light source 40 can be enhanced by reflection off materials such as aluminum, white or colored paint or other light reflecting structures on reflective surface 38. FIG. 2-B illustrates yet another variation in which the louvers 44 are angled horizontally to allow light to enter from the side. The louvers are segmented so that the slit width remains consistent from different viewing angles. In addition, the viewing slits 41 are formed near the middle of each segmented louver 44 to reduce the chances that lines of sight be occluded by adjacent rastors.

Figure 3:
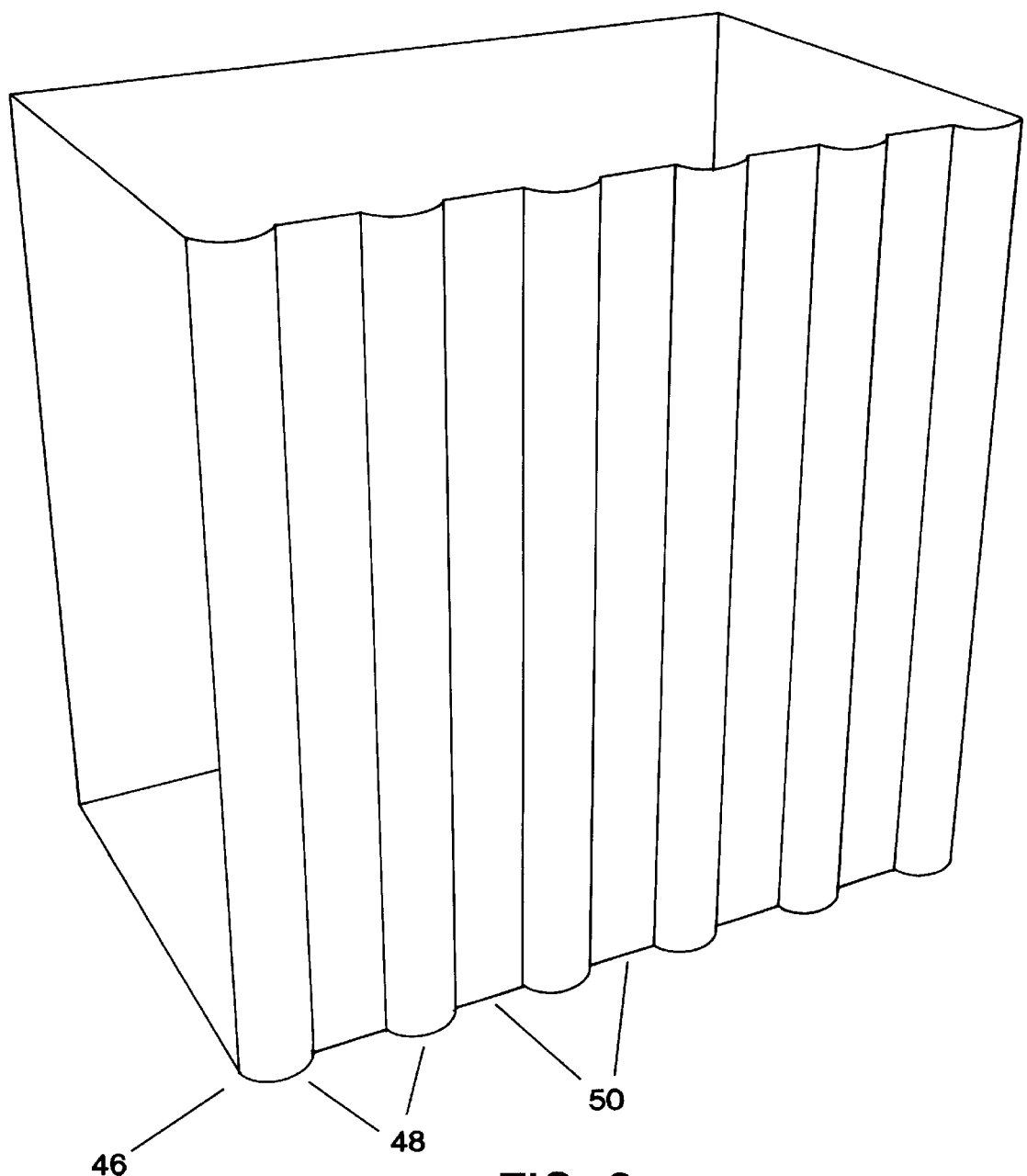
FIG. 3 is a perspective view of a free vision three dimensional image display having a rastor comprised of lenticular strips which alternate with opaque portions as in a standard type rastor structure.

Reference is now made to FIG. 3. FIG. 3 is similar to FIG. 1 in that the rastor (referred to generally by reference numeral 46) has a clear portion of lenticular lenses 48 similar in function and operation to the lenticular lenses 18 described in connection with FIG. 1. The opaque portions 50 of the rastor 46 are plain, optically opaque areas between the lenticules. This simplified structure enables the light enhancement from the illuminated lenticular lenses as an advance over the prior art while still enabling the free vision image. The opaque structure 50 forms barriers to the passage of light. It should be specifically recognized that the system of the present invention allows the use of lenticular lenses, wedges, louvered structure elements, and/or equivalent structures employed alone or in various combinations. This depends upon the particular situation and is a matter of design choice.

Figure 4:
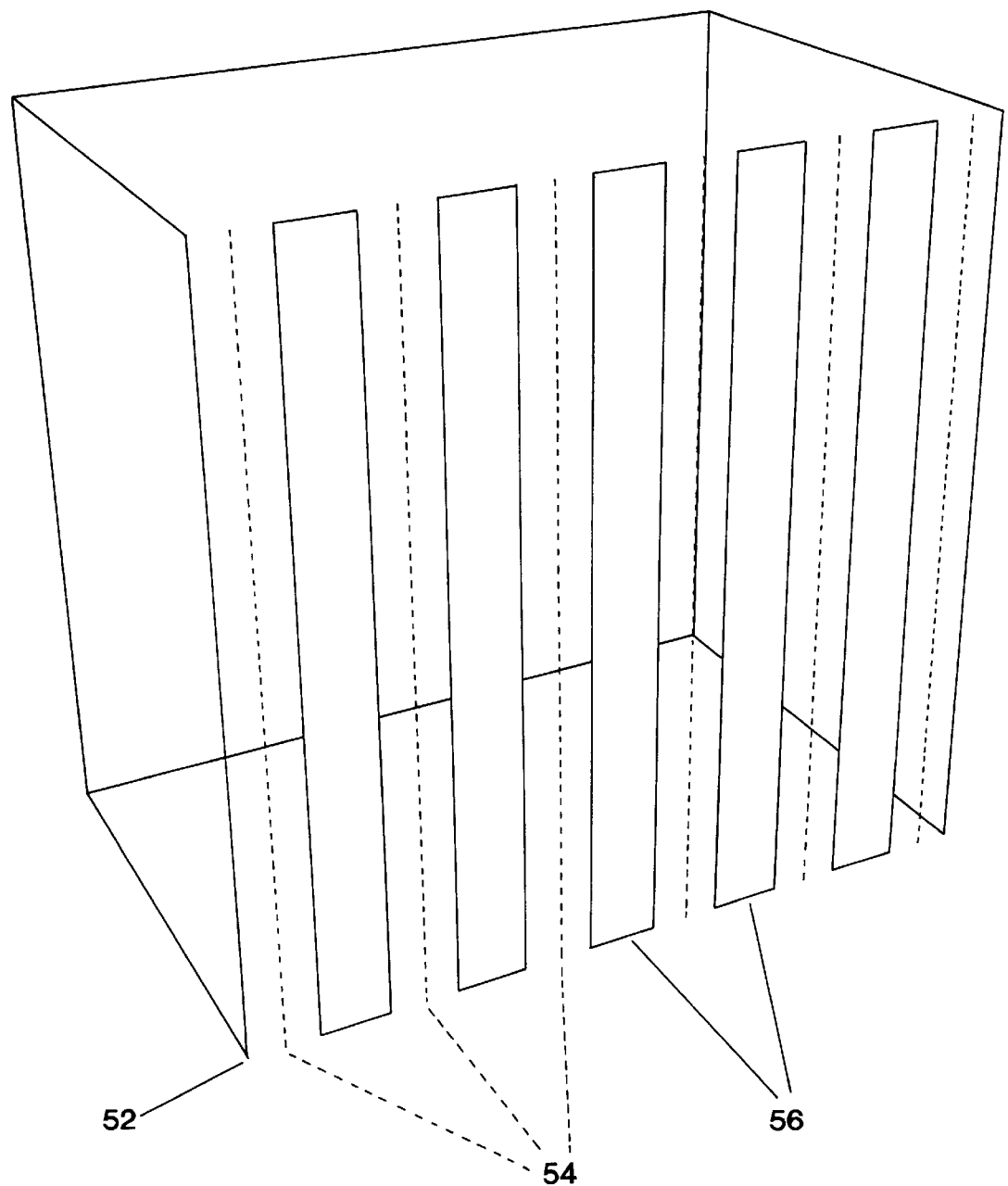
FIG. 4 is a perspective view of a free vision three dimensional image display similar to FIG. 3 but employing flat index-gradient type lenses.

Reference is now made to FIG. 4 which is similar in function and operation to FIG. 3 except that the optically clear portions of the rastor (referred to generally by reference numeral 52) are index gradient lenses 54. These index gradient lenses are flat lenses which function much like the lenticular lens. One suitable index gradient lens is known as the sel-foc (self-focusing) lens. Such lenses have been produced for example, by doping glass with lithium niobate. Dotted lines 54 indicate the center of the doped areas. In actuality these spaces appear clear. The opaque portions 56 of the rastor 52 form barriers to the passage of light as in the figures already described. Another way of forming flat lenses is with holographic film. By making a hologram from lenticular optics or by computer design imaging, a holographic optical element (HOE) can be formed which will function in much the same way as the lenticular or sel-foc optics. Indeed, the opaque rastor can be printed on the same film. These figures all result in light enhanced free-vision images for front and/or rear illumination.

Figure 5:
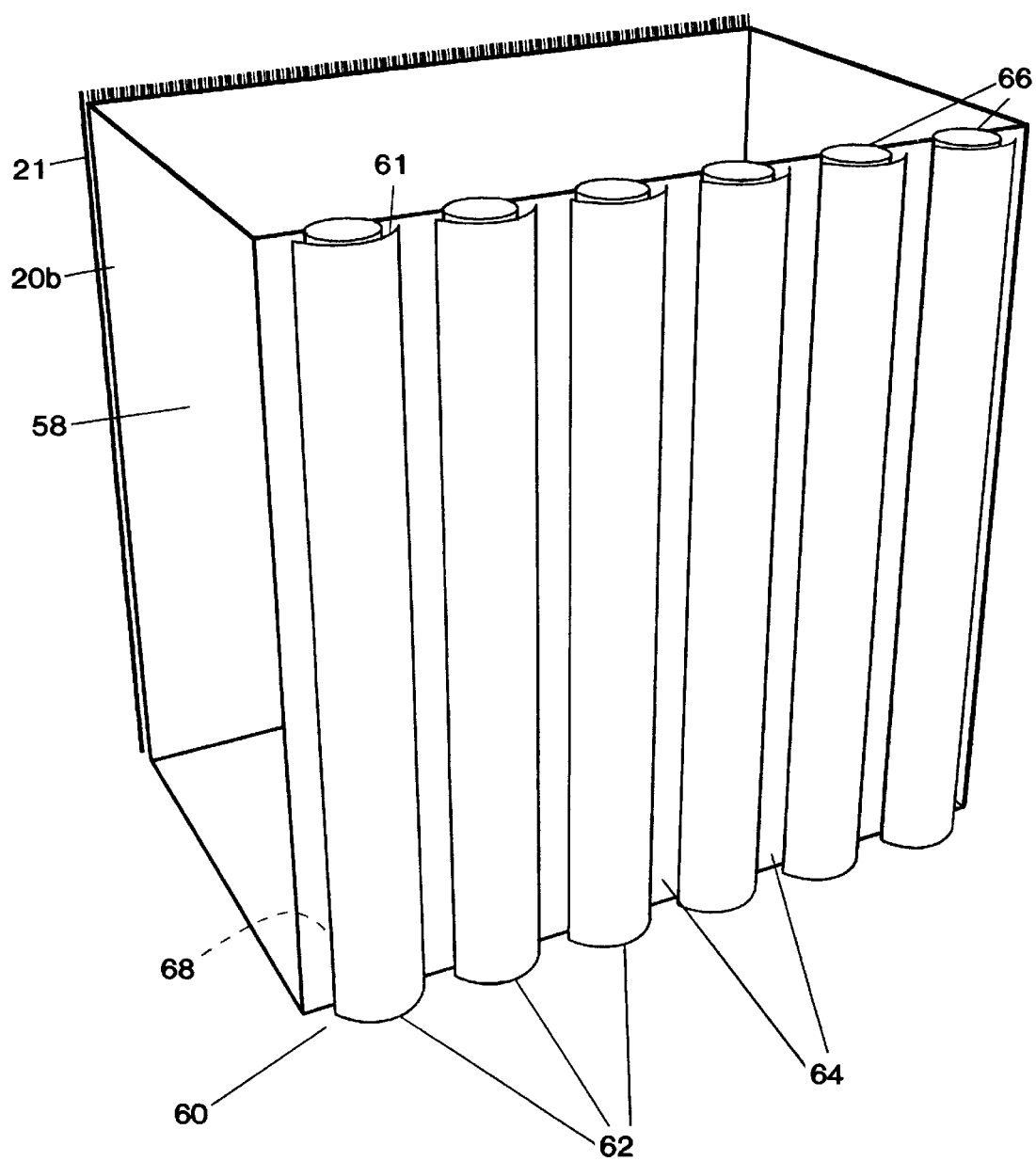
FIG. 5 is a perspective view of a large scale free vision three dimensional image display wherein fluorescent tubular lights and their reflectors comprise the opaque lineation.

Reference is now made to FIG. 5. This structure and equivalent structures are particularly well suited for large displays such as billboards. These displays had not been capable of producing free-vision three dimensional images in the past. This invention provides structures that enable three dimensional and changeable images based on viewer motion that are back, internally, and/or front lit. FIG. 5 includes a surface 20b where an interlaced image 21 is supported. A transparent (air) spacer 58 separates the surface 20b from the rastor shown generally by reference number 60. A structure 68 can be mechanical such as a frame of wood, metal, plastic pieces, or molded parts which can be solid or skeletal and are design choices of the maker. The structure should be constructed to keep the opaque rastors 62 parallel to each other and the lineations of the interlaced free-vision image, and equally spaced from the surface 20b. The rastor includes parallel lineations of alternately opaque portions 62 and clear portions 64. The opaque portions, hood members, may have a curved shape and house within them or behind them light sources such as fluorescent lights 66. The fluorescent lights 66 provide illumination within the free-vision image structure to illuminate the image 21 which can fluoresce or be made of a fluorescing material such as off the shelf paints or dyes to further enhance illumination. The light sources may be tubular or reflect in such a way to provide as even as desired light to the image on surface 20. The light color emission is a design choice for both level and effect in relation to the image.

The fluorescent light may be enhanced by a reflective coating on the spacer side of the opaque rastor portion 62. The reflective material is designated by the reference numeral 61 and may be, for example, polished steel or aluminum, painted material, or other suitable reflecting surface. Uniformity of illumination and brightness may be increased by the use of a parabolic shape that reflects light emitted from all sides of the tube onto the image. The use of many light sources such as numerous fluorescent bulbs provides the advantage of strong and uniform illumination of the image mounted on surface 20b. The increased front illumination of the image surface allows the images to be printed on paper or other opaque materials. Printing on paper typically has a lower resolution than imaging on film but in these large scale applications there is no problem holding the detail necessary for high quality images. This is because the size of the image scales up along with everything else. It should be noted that by integrating the fluorescent light into the rastor structure, the rastor structure can be mounted to existing billboards by any suitable structure or mounting means. The addition of a properly interleaved and positioned image 20 on the billboard surface 20b is also needed to produce the three dimensional or viewer-movement-changeable image effect.

It should be noted that billboards vary considerably in size and shape but a standard "30 sheet" billboard is 259 inches wide by 115 inches high. This is approximately 16 times the size of 16 by 20 inch prior art version. A spacer which was previously ⅛ of an inch may become 2 inches and could be an air spacer. A ¹⁄₅₀ of an inch wide rastor line could become a ⅓ inch rastor line and a 10 foot viewing distance increases to 160 feet. With a 2 inch air spacer between the rastor 60 and the billboard surface 20b, it is possible to light from the sides or place thin fluorescent bulbs directly behind the rastor lines. Here the illumination is provided by attenuated fluorescent lamps 66 made from 8 mm tubing. These bulbs can be partly painted black so that only a strip of illumination is left down the backside (facing the image surface) such that the bulbs themselves form the opaque portion of the rastor. It should be noted that these illumination sources, rastors, and their reflective structures, can be joined together, as when the tubes are painted, or they can be built as separate components as shown in FIG. 5. Whether they are built as single or separate units is a matter of design choice.

In one embodiment of this billboard application, a second image is printed on the opaque rastor 62 so that the bulbs can be turned off for a conventional display during daylight hours. At night the three dimensional image can be turned on. Illumination could even alternate between the second flat image and the three dimensional images for additional special effects.

Figure 6:
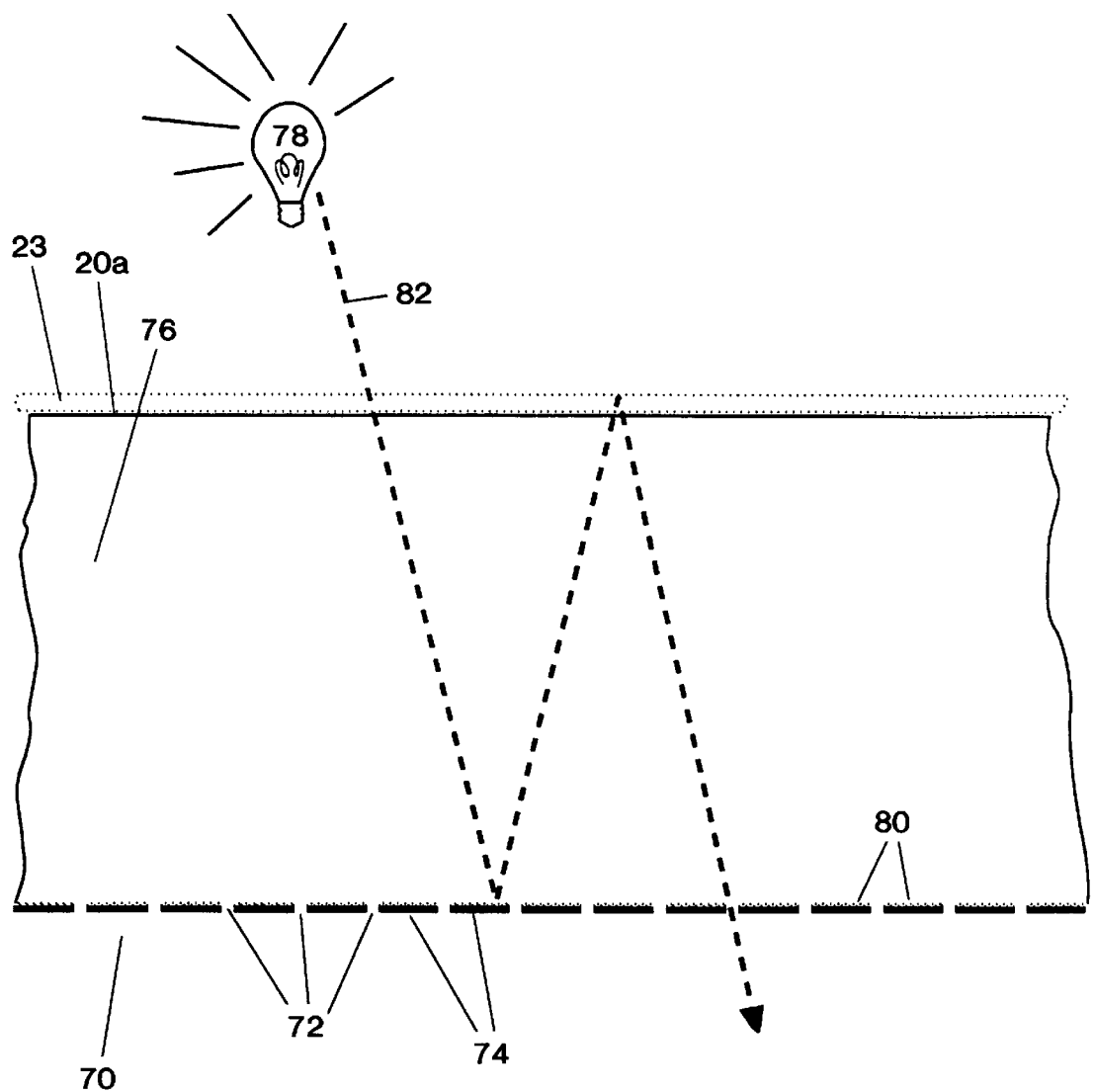
FIG. 6 is an enlarged diagrammatic top cross-sectional view of a free-vision three dimensional image display employing a light enhancing structure wherein light that enters the display from behind is reflected from material on the image side of the opaque rastor lineations.

Reference is now made to FIG. 6. FIG. 6 is a top-view diagram of a free-vision, image wherein the rastor, shown generally by referenced numeral 70, has clear portions 72 and opaque portions 74. A spacer 76 separates the rastor 70 from a transparent or translucent image 23 mounted to surface 20a and backlit by a light source 78. A reflective coating or surface 80 is applied to the rear portion of the opaque portions 74 of the rastor 70.

The light which passes through the translucent image 23 (as shown by light ray 82 for example) strikes the reflective coating or surface 80 of the opaque portions 74 of the rastor 70 and is reflected back to impinge on the image 20 before exiting the structure through the clear portions 72 of the rastor 70 for viewing. In this manner, the light within the free-vision, interlaced image structure is not absorbed by the rastor but is reflected back onto the image 20, thereby maximizing the utilization of the available light from the light source 78. If the light strikes a bright portion of the image 23, it can be again reflected back onto the reflective surface 80 and be reflected back again and again to not only conserve the available light and enhance brightness, but to increase the contrast of the viewed image. Bright, highly reflective portions of the image 23 will bounce light back and forth between the image and the reflective surface 80 until it escapes through the viewing aperture 72, whereas dark portions of the image 23 will absorb the light.

If we assume no absorption of the light by the image 23 or the reflecting surface 80 and those reflecting surfaces (not shown) behind the light source 78, then all the light will eventually escape through the slits in the rastor 70. If we instead assume 100% absorption by the back of the black rastor lines 74 then only 10% of the light will escape from a 90% opaque rastor. In practice, surfaces that reflect most of the light and an image 23b that absorbs less than half of the light passing both ways through it will yield luminosity several times greater than when it is all absorbed.

It should be noted that this re-reflection may create "cross talk" by affecting adjacent lineations of the image 23b as the light is re-reflected. For example, if a light blue colored subject is placed in front of a bright red background, the edges of the subject and background will be tinted purple. This effect is more pronounced the further the subject is from the zero plane of the depth axis (the physical plane of the film, paper, or electronic display surface is considered to be zero on the "Z" depth axis). Objects that are far forward or back from this plane tend to have their interlace lineations interspersed with other parts of the image. Therefore the above described arrangement is suitable only in certain applications where such cross-talk, should it occur, would not be objectionable. However, the cross-talk can be reduced by white fluorescent pigmentation in the reflective surface 80 which tends to neutralize color characteristics during re-reflecting in a known manner.

Figure 7:
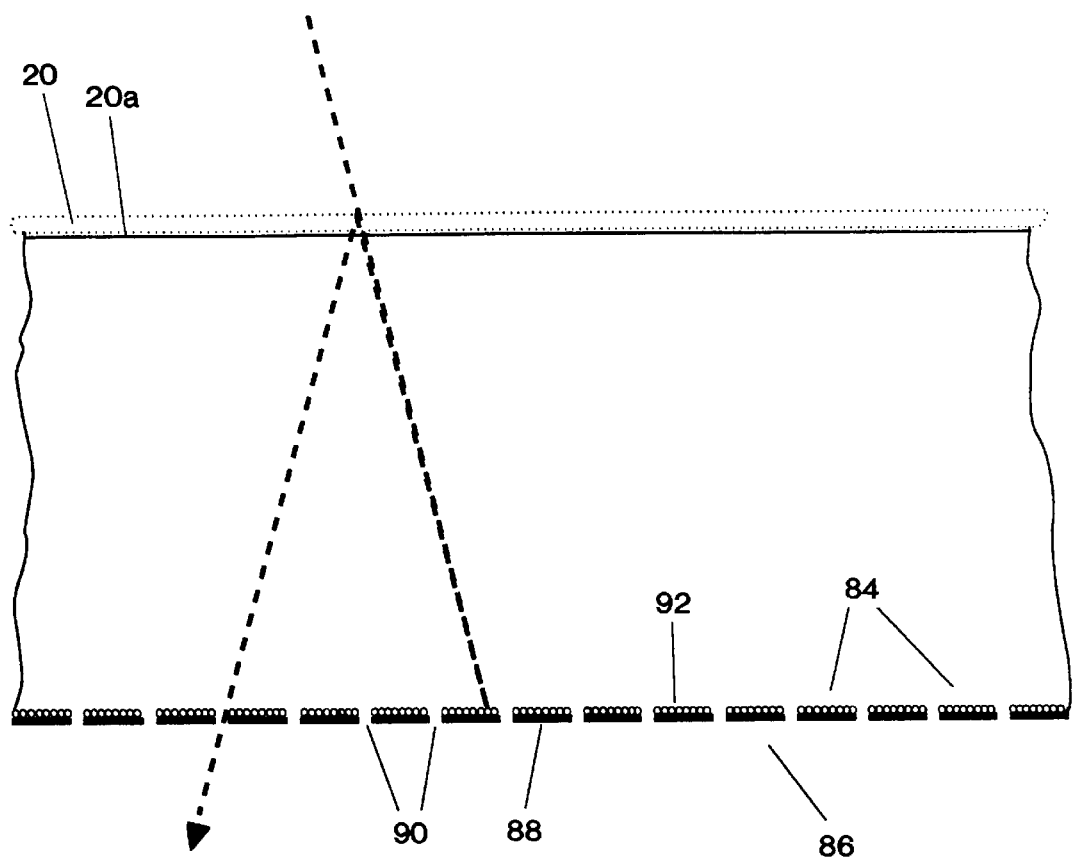
FIG. 7 is a diagram similar to FIG. 6 wherein the reflective material on the image side of the rastor pattern is comprised of reflective light directing media such as glass or plastic beads.
Figures 7A, 7B:
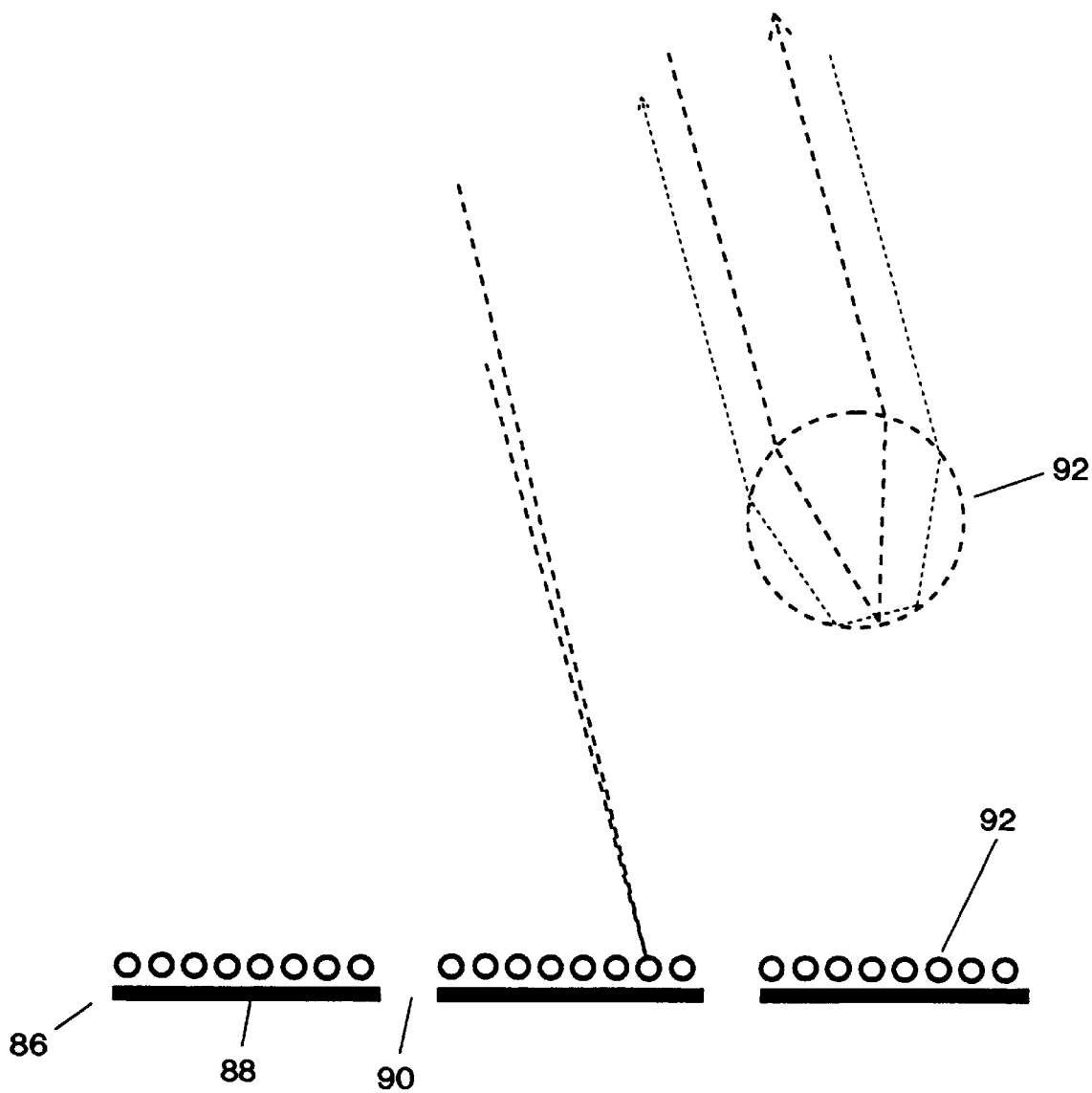
FIG. 7a is an enlargement of a portion of the reflective light directing media and rastor of FIG. 7.
FIG. 7b is an enlargement of a portion of the reflective beads of FIG. 7.

Reference is now made to FIG. 7 which is another free-vision, interlaced image display structure wherein a reflective surface 84 is provided on the spacer side of the rastor structure (shown generally by reference number 86)

which is comprised of opaque portions 88 and optically clear portions 90. However, as shown in the enlarged views of FIGS. 7a, and 7b, beads 92 made of glass or other reflective materials such as those used in highway signage and reflective sportswear are employed on the reflective surface. While this surface corresponds to surface 80 in FIG. 6, the beads 92 provide the additional advantage of reducing cross-talk. The glass beads have the characteristic of reflecting back the light to the lineations of the image 20 from which they originated. This is because of the refractive and internally reflective properties of the materials combined with their designed shapes. This reduces cross-talk because light that has been colored by transmission through or reflection from a portion of the image display is not reflected onto adjacent lineations. This glass bead structure enhances the viewed image's clarity and color fidelity to the original subject.

Figure 8A:
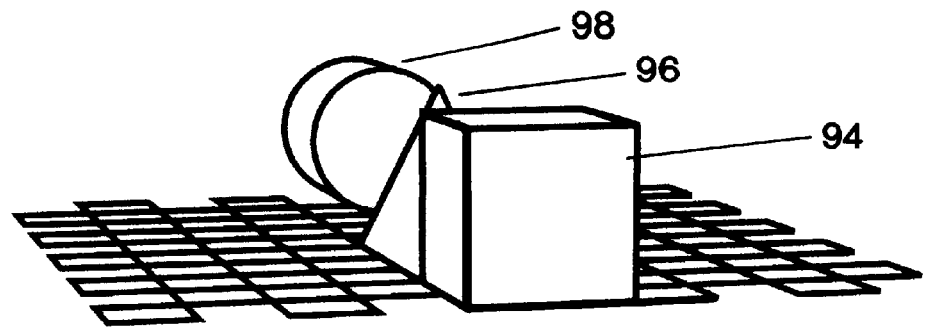
FIGS. 8a, 8b, and 8c are frontal perspective views of the relative positions of three geometric shapes as viewed from different vantage points—left (FIG. 8a), center (FIG. 8b), and right (FIG. 8c). These are included to help in understanding the invention.
Figure 8B:
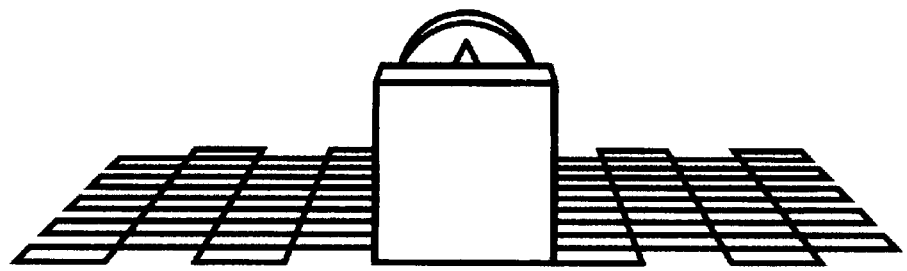
Figure 8C:
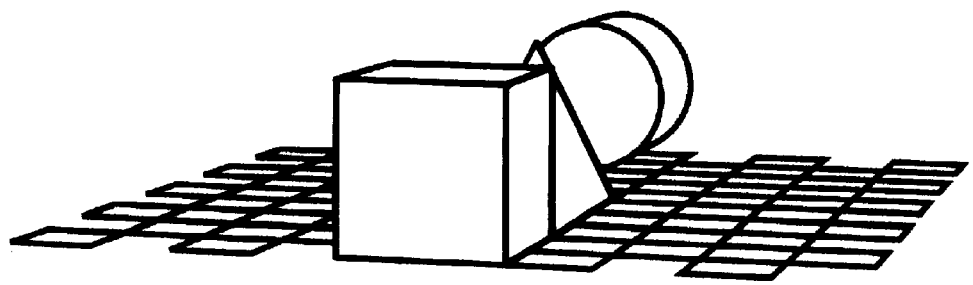
Figure 9:
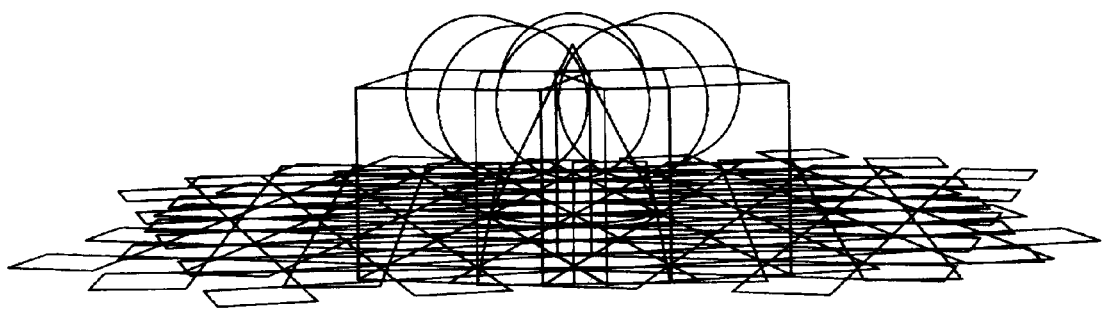
FIG. 9 is a front view diagram of the film, paper, or electronic display surface in which the three geometric shapes of FIG. 8 are imaged and interlaced to appear at different depth positions.

To further illustrate the phenomenon of cross-talk and to illustrate some characteristics of interlacing (also known as interleaving) images, reference is now made to FIGS. 8 & 9. FIGS. 8 a, b, and c are front view perspective diagrams of the relative positioning of three geometric shapes 94, 96, and 98, when viewed from the left, straight on, and the right, respectively. FIG. 9 is a diagram of the film, paper or electronic display surface on which those same geometric shapes are imaged and interlaced to appear at different positions on the depth axis. The relative lateral displacement of the shapes in FIGS. 8 a, b, and c occurs as one views them from different vantage points. In this case, as we move from left to right, the front cube 94 moves from right to left (as measured relative to the central cone placed at zero on the "Z" or depth axis). When an interlaced image is made of this arrangement for subsequent display in the manner described, the image lineations of the cube 94 in front and the cylinder 98 in back will be interspersed with other portions of the subject matter and/or background. This is illustrated in FIG. 9. Areas 100 of the image 20 that appear farthest in front or behind the plane of the image display are thus at the highest risk of cross-talk color contamination when light is reflected and re-reflected within the components of the display means. Foreground and background will tend to average their hue, value, and chroma with a corresponding loss of clarity and detail.

Figure 10:
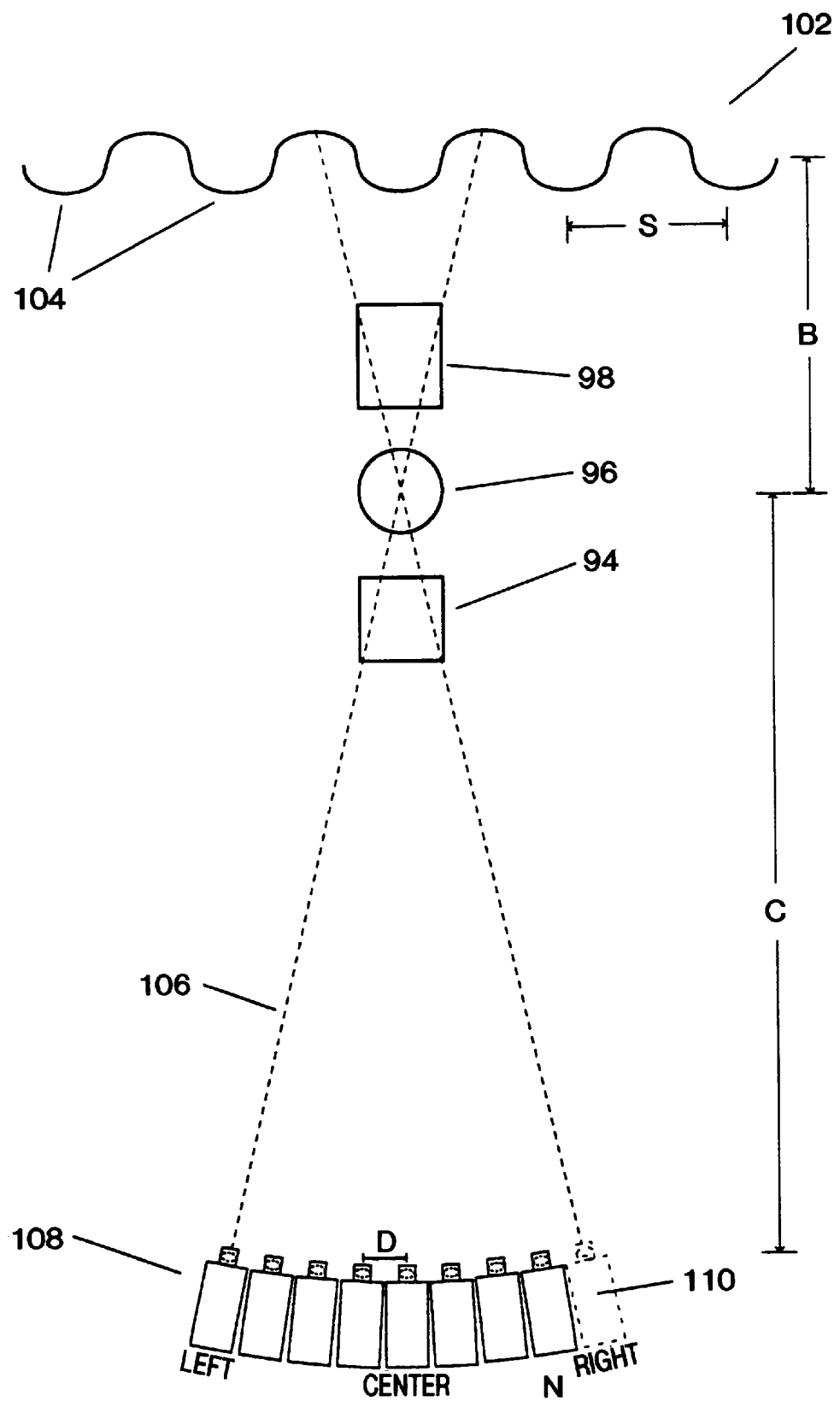
FIG. 10 is a top diagrammatic view of the arranging of a subject relative to a backdrop containing a repeat pattern to minimize the appearance of background displacement.

Reference is now made to FIG. 10 which is a top view perspective diagram of the same arrangement of geometric shapes of FIGS. 8 and 9 but with the addition of a background screen 102 containing a repeating pattern such as folds 104. This screen is representative of backgrounds such as wallpaper, folded curtains and fences that contain elements that repeat on the "Y" axis. Lines 106 have been drawn from a series of view recording positions 108, through the cone 96 at the center of the image to the folds 104 of the background screen 102. These lines indicate positions from which the subject matter will be imaged, plus an imaginary or phantom position 110 which lies next in the sequence. The frequency and positioning of the screen folds are coordinated with the view recording positions 108 so that the imaginary position would superimpose its view of the repeating pattern with the view from the first position in the sequence.

This follows the formula:

$$S = \frac{(N+1)DB}{C}$$

in which S=the distance between the adjacent forward folds of the screen, N=the number of view recording positions, D=the distance between centerpoints of adjacent recording positions, C=distance from the recording positions to the center of the subject, and B=the distance from the backdrop screen to the center of the subject.

It should be noted that the frequency of the screen folds 104 can be integer multiples of those illustrated. In other words, the first and (last+1) imaginary view recording positions can superimpose the second or third folds over and not just the adjacent ones. It should also be noted that this repeat pattern overlap strategy can be employed with other repetitive elements in the subject matter, whether behind or in front of the zero plane of the Z- axis. By these arrangements dislocation of the subject matter is reduced or eliminated. Views of the three dimensional image display from the left-most and the right-most positions have repeating elements that almost superimpose to form a smooth "handoff" transition. This reduces the "jump" effect observed in prior art and thereby viewing is enhanced.

Figure 11:
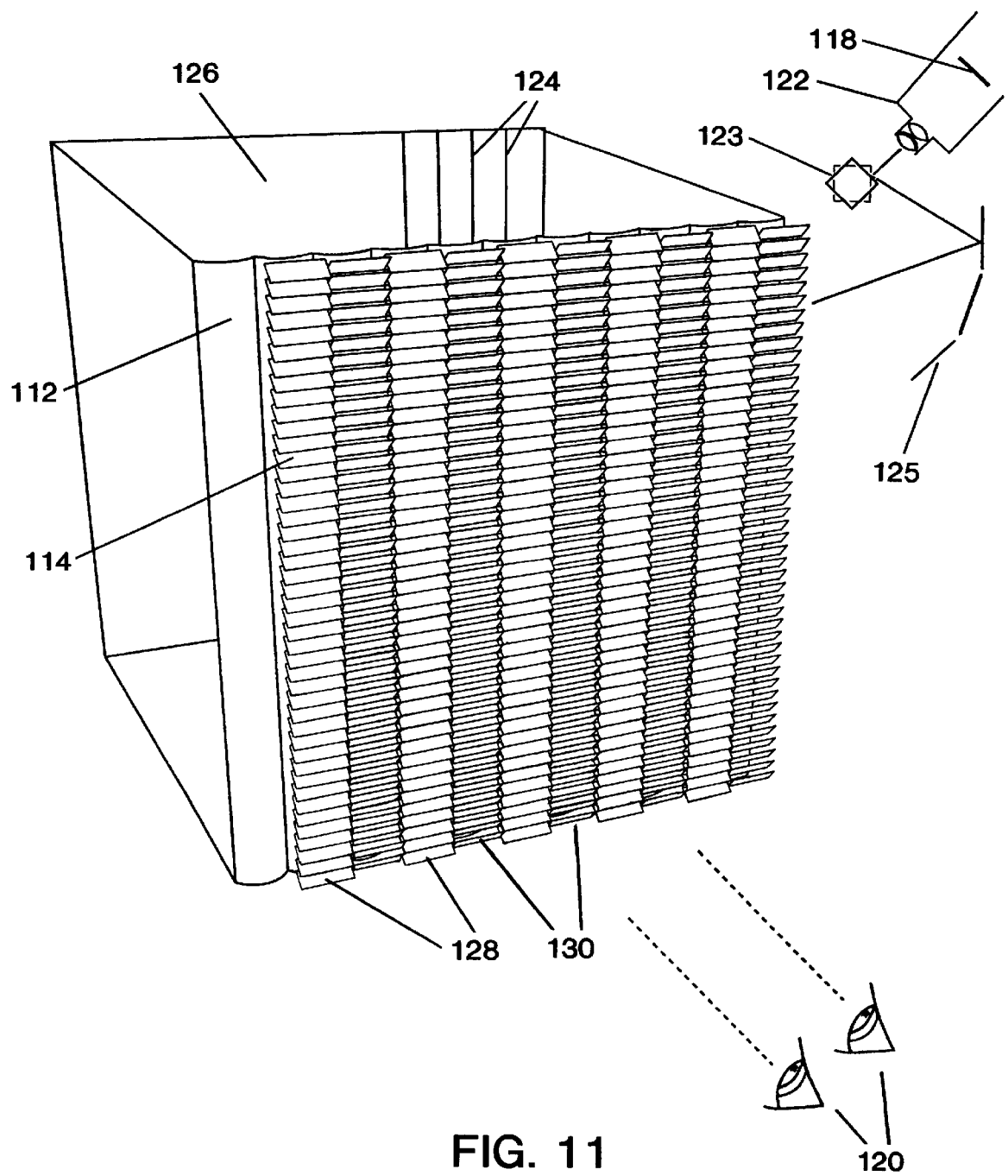
FIG. 11 is a perspective view of a free-vision three dimensional moving image viewed through a screen arrangement having lenticular and rastor/louver elements and projected from the front by a movie film projector or projectors.
Figure 11A:
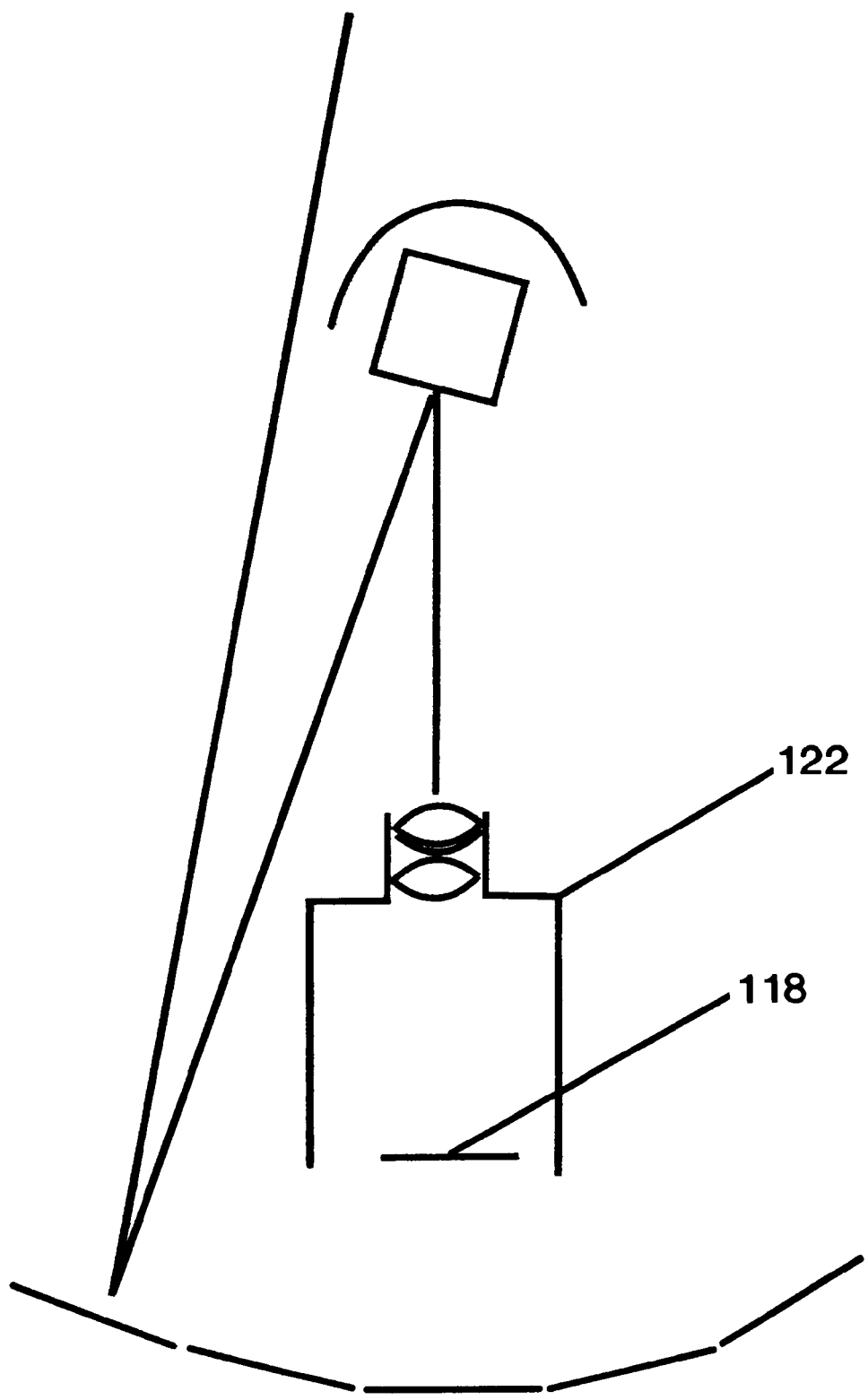

Reference is now made to FIG. 11 which is a pictorial perspective view of a lenticular optical elements 112 and louver 114 screen combination that is constructed in such a manner that motion picture images 118 can be projected from in front and above while people 120 can view the resultant three dimensional images from in front and below. The positioning of the louvers 114 allows light from the projector 122 to pass through the lenticular optical elements 112 where they are refracted and focused in vertical strips 124 on the reflective screen 126. Flat surfaces, sel-foc lenses, or other transparent structures can be used in place of the lenticular lenses of that is desired. To interleave a full set of images 118 in strips 124 on the reflective screen 126, the images 118 are projected from different angles. This can be done with multiple synchronized projectors, not shown, or by a single projector 122 that sequentially projects the set from different angles. A step rotating multifaceted mirror 123 may be employed with front surface mirrors 125 and a single projector 122 to reflect the sequential images 118 from the different angles required.

The interleaved set of images are viewed on the reflective screen 126 by looking through the louvers that slope downwards to the outside of the imaging structure. The upward sloping louvers 130 that allowed the projected images to pass through occlude our vision from the lower angles and thereby function as a barrier, like the opaque portions of the rastor in FIGS. 1, 2, and 3. Similarly the louvers 128 that are viewed through occlude the light from the projector(s). Thus two sets of differently positioned louvers are provided, one set sloped up for projection and one set sloped down for viewing. As in the previous examples, wedges or other structures can be exchanged for the louvers as long as they function similarly and enable the result of projecting from one angle while viewing from another. As with the billboards, a suitable framing structure can support the rastor 114 spaced in proper relationship to the image screen 126.

To further clarify this process, one can follow one of the images as it is projected from the projector 118 to the viewer at 120. The image may be projected in a manner similar to conventional movie theaters but the projector 122 is mounted sufficiently high so that the angle of projected light passes down through the set of upward sloping louvers without much interference. In our illustration, the downward sloping louvers occupy 50% of the louvered rastor structure but the ratio of upward to downward sloping louvers may be changed to suit the arrangement of the projecting and viewing environment.

Figure 12:
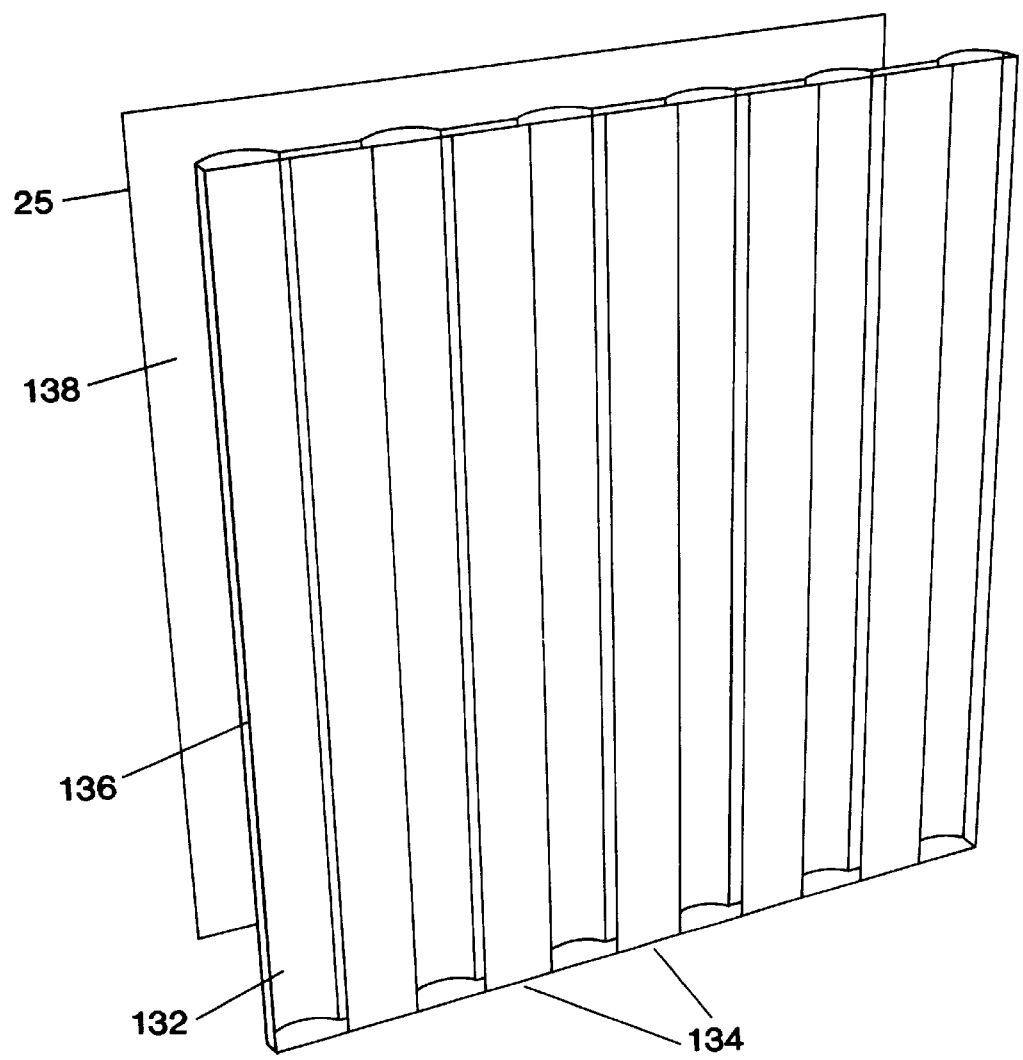
FIG. 12 is a perspective view of a free-vision three dimensional display similar to FIG. 3 but utilizing reversed lenticular optics and an air spacer between the lenticular/rastor structure and the image surface.
Figure 12A:
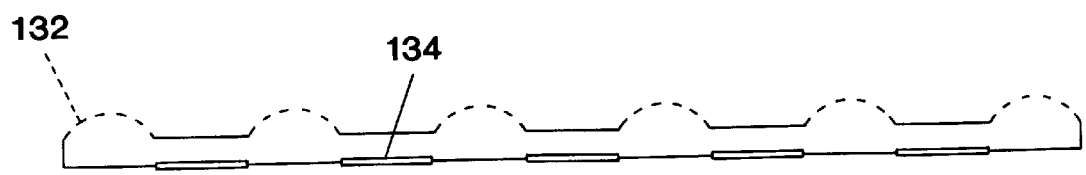

FIGS. 12 and 12a illustrate another version of the invention with applicability to both motion pictures and large scale displays. In this case lenticular elements 132 have been combined with rastor components 134 as in FIG. 3, but the lenticules have been placed on the back side of the rastor bearing structure 136. An air gap between the lenticular surface and the image plane surface 25 ensures the refractive focusing properties of the lenticules 132. The lenticule elements have been reversed to reduce surface glare. This enhances viewing because glare degrades the image for both motion picture and conventional display applications. A matte black rastor, employed as the raster components, 134 may be employed to further reduce glare. If the rastor has been applied to the back side between the lenticules, the material's surface can be cast with a texture in the rastor portions to minimize specular reflection.

As explained above, the invention may be embodied in many other specific forms and in different combinations of features depending on the particular application. For example; a billboard printed with an interlaced image as in FIG. 12 and overlaid by a lenticular rastor that is affixed to the billboard with screws and risers. Another example would be a movie theater with a custom projector and screen as in FIG. 11 that enables viewing freevision three dimensional motion pictures. A further example would be an image printed on a display film stock as in prior art, but employing the lenticular/rastor structure of FIG. 3 to enable brighter viewing with fewer distracting jumps of the subject. Thus the preferred embodiment described must be considered simply as illustrative and not restrictive. As a result, many combinations and variations are intended to be within the spirit and scope of the claims.

What is claimed is:

1. A method for manufacturing a rastor display device for observing three dimensional images with limited jump between images comprising:

recording multiple images of different angles of view relative to a subject having a repeating pattern, including forward, centerpoint and backdrop positions;

printing or projecting the series of recorded images interlaced in a pattern on a display surface;

assembling the interlaced pattern behind and spaced from a rastor surface such that the lineations in the interlaced pattern are parallel to and separated by a specific distance from the rastor such that when viewed from the rastor side, a three dimensional image appears;

said image including a repeating pattern such that it follows the formula $$S = \frac{(N + 1)DB}{C}$$

in which S=the distance between adjacent repeats in pattern portion of said image; N=the number of view recording positions; D=the distance between centerpoints of adjacent lens positions; C=distance from the recording positions to the center of the subject, and B=the distance from the repeating pattern to the center of the subject.

2. A rastor display device for observing three dimensional images with a brighter viewing capability by allowing an increased amount of light to enter and remain internal to said rastor display device comprising:

a transparent spacer having first and second substantially parallel sides;

a rastor pattern on said first spacer side having opaque portions;

an image on said second spacer side such that when viewed from said rastor side forms a three dimensional appearing image; and, a light enhancing structure associated with the opaque portions of said rastor pattern for allowing an increased amount of light to enter said spacer through said opaque portions to increase the light impingement on said image.

3. A structure as defined in claim 2 wherein said light enhancing structure includes light passing portions of said rastor patterns positioned to be obscured from view by the opaque portions of said rastor pattern of alternately opaque and optically clear portions for enhancing light entering said rastor display device.

4. A structure as defined in claim 3 wherein said light enhancing structure is an optical member.

5. A rastor display device as defined in claim 2 wherein light enhancing structure is light reflecting.

6. A rastor display device as defined in claim 5 wherein said light enhancing structure reflects diffuse illumination onto said image.

7. A rastor display device as defined in claim 6 wherein said light enhancing structure is of a color which reflects light spectrum that enhances the illumination of the image.

8. A rastor display device as defined in claim 7 wherein said light enhancing structure comprises a rough surface of reflecting material.

9. A structure as defined in claim 8 wherein said rough surface is a plurality of reflecting beads.

10. A rastor display device for observing three dimensional images with a brighter viewing capability by allowing an increased amount of light to enter and remain internal to said rastor display device comprising:

a rastor pattern, having opaque and light passing portions;

an image support;

a plurality of light enhancers associated with said rastor pattern for allowing an increased amount of light to enter said space between said rastor pattern and said image support;

said plurality of light enhancers, associated with said rastor pattern, such that at least one light enhancer is positioned between adjacent opaque portions of said rastor pattern for allowing an increased amount of light to enter the space between said rastor pattern and said image support; and, an image supported on said image support parallel to and spaced apart from said rastor pattern and said light enhancing means such that when viewed from said rastor side forms a three dimensional appearing image.

11. A structure as defined in claim 10 wherein said light each of said enhancers is a plurality of optical members each separated by at least one rastor pattern.

12. A structure as defined in claim 11 wherein each optical member is a lenticular lens.

13. A structure as defined in claim 11 wherein each optical member is a index gradient lens.

14. A structure as defined in claim 11 wherein each optical member is a holographic optical element.

15. The rastor device as claimed in claim 10 wherein said image is formed of at least some fluorescent material.

16. A billboard rastor display device for observing three dimensional images with a brighter viewing capability by allowing an increased amount of light to enter and remain internal to said billboard rastor display device comprising:

a rastor pattern having parallel lineations of alternately opaque and optically clear portions;

an image support capable of supporting an image thereon parallel to and spaced apart from said rastor pattern such that when viewed from said rastor side of the billboard forms a three dimensional appearing image; and, a light enhancer supported between said image support and said rastor pattern to increase the amount of light impinging on said image support for allowing an increased amount of light to enter said billboard rastor display device.

17. A rastor display device as defined in claim 16 wherein enhancer means is a light source.

18. A billboard rastor display device as defined in claim 16 wherein said light enhancer is a light source between said image support and said rastor pattern.

19. A structure as defined in claim 18 further comprising a reflective member mounted behind said light source.

20. A structure as defined in claim 19 wherein said opaque portions are of a parabolic shape.

21. A structure as defined in claim 18 wherein the area of said light enhancer adjacent said rastor pattern is of a dark, light absorbing color.

22. A structure as defined in claim 21 wherein said color is black.

23. A rastor display device as defined in claim 16 wherein light enhancer is a fluorescent light.

24. A structure as defined in claim 16 wherein at least one of said opaque portions are formed by members to house said light enhancing means.

25. The billboard rastor device as claimed in claim 16 wherein at least some of said opaque portions of said rastor pattern have transparent sections.

26. The billboard rastor device as claimed in claim 16 wherein a second image mounted on the opposite side of said opaque portions of said rastor pattern and not interfering with the optically, clear portions of said rastor pattern so that said second image may be viewed in day light and said three dimensional appearing image may be viewed during other than daylight when illuminated by said light enhancing means.

27. A rastor display device for observing three dimensional images with a brighter viewing capability by allowing an increased amount of light to enter and remain internal to said rastor display device comprising:

a spacing means;

a rastor pattern supported on said spacing means;

said rastor pattern having parallel lineations of alternately opaque and optically clear portions;

an image supported on said spacing means parallel to and spaced apart from said rastor pattern such that when viewed from said rastor side of said spacing means forms a three dimensional image; and, each of said opaque portions of said rastor pattern having transparent sections for allowing an increased amount of light to enter and remain internal to said spacing means.

28. A structure as defined in claim 27 wherein at least some of said opaque portions are divided into transparent and opaque sections.

29. A structure as defined in claim 28 including a plurality of said transparent sections and a plurality of opaque sections, each transparent section separated by an opaque section.

30. A structure as defined in claim 27 wherein said transparent sections are horizontally disposed and wherein the portion of said spacing means on which said image is formed has at least a partially reflective surface;

projection means associated with said transparent sections for projecting images through said optically clear portions of said rastor pattern to said reflective surface.

31. The structure of claim 30 wherein said spacing means includes lens elements between said rastor pattern and said reflective surface for focusing portions of the image in vertical strips on said reflective surface.

32. The structure of claim 31 wherein said projection means projects to said reflective surface from different angles.

33. A rastor display device for observing three dimensional images with a brighter viewing capability by allowing an increased amount of light to enter and remain internal to said rastor display device comprising:

spacing means;

a plurality of rastor patterns supported on said spacing means;

a plurality of light enhancing means supported on said spacing means;

said plurality of rastor means and said plurality of light enhancing means supported on said spacing means such that at least one light enhancing means is positioned between adjacent rastor patterns for allowing an increased amount of light to enter; and, and image supported on said spacing means parallel to an spaced apart from said rastor pattern and said light enhancing means such that when viewed from said rastor side of said spacing means forms a three dimensional image and, said light enhancing means supported on the image side of said opaque portions of said rastor pattern to increase the amount of alight impinging on said image for allowing an increased amount of light to enter.

34. A structure comprising:

spacing means;

a plurality of rastor patterns supported on said spacing means;

a plurality of light enhancing means supported on said spacing means;

said plurality of rastor means and said plurality of light enhancing means supported on said spacing means such that at least one light enhancing means is positioned between adjacent rastor pattern means;

an image supported on said spacing means parallel to and spaced apart from said rastor pattern and said light enhancing means such that when viewed from said rastor side of said spacing means forms a three dimensional image said light enhancing means supported on the image side of and behind said opaque portions of said rastor pattern to increase the amount of light impinging on said image, and at least some of said opaque portions of said rastor pattern having transparent sections.

35. A structure comprising:

a transparent spacer having first and second substantially parallel sides;

a rastor pattern on said first spacer side;

an image formed of fluorescent material on said second spacer side such that when viewed from said rastor side of said spacer forms a three dimensional appearing image; and, said rastor pattern having parallel lineations of alternately opaque and an optically clear portions and having light sources associated within the opaque portions on the image side of the rastor pattern, said rastor formed to illuminate said image for viewing by light passing through said spacer and impinging on said image.

36. A structure comprising:

spacing means;

a rastor pattern supported on said spacing means;

said rastor pattern having parallel lineations of alternatively opaque and optically clear portions;

an image supported on said spacing means parallel to and spaced apart from said rastor pattern such that when viewed from said rastor side of said spacer forms a three dimensional appearing image;

light enhancing means supported on said image side and behind said opaque side of said rastor pattern to increase the amount of light impinging on said image; and, a second image mounted on the opposite side of said opaque portions of said rastor pattern and not interfering with the optically clear portions of said rastor pattern so that said second image may be viewed in day light and said three dimensional appearing image may be viewed during other than daylight when illuminated by said light enhancing means.

37. A method for manufacturing a rastor display device for observing three dimensional images with a brighter viewing capability by allowing an increased amount of light to enter and remain internal to said rastor display comprising:

recording multiple images of different angles of view relative to a subject;

interlacing the series of recorded images in a pattern on a display surface;

assembling the interlaced pattern behind a rastor having opaque and transparent portions in such a manner that the lineations in the interlaced pattern are parallel to and separated by a specific distance from the rastor;

providing for light enhancement to enter and be retained internally to the display surface and the rastor.

38. The method as claimed in claim 37 wherein providing for light enhancement to enter and be enhanced internally to the display surface and the rastor is attained by enabling light to enter the rastor display through the opaque portions of the rastor.

39. The method as claimed in claim 37 wherein providing for light enhancement to enter and be retained internally to the display surface and the rastor is attained by enabling light to be retained in the rastor display through light entering from behind the opaque portions of the rastor.

40. The method of claim 34 wherein providing for light enhancement to enter and be retained internally to the display surface and the rastor is attained by providing light to enter the rastor display through enhancing light entering the transparent portions of the rastor.

\* \* \* \* \*